UNITED STATES PATENT OFFICE.

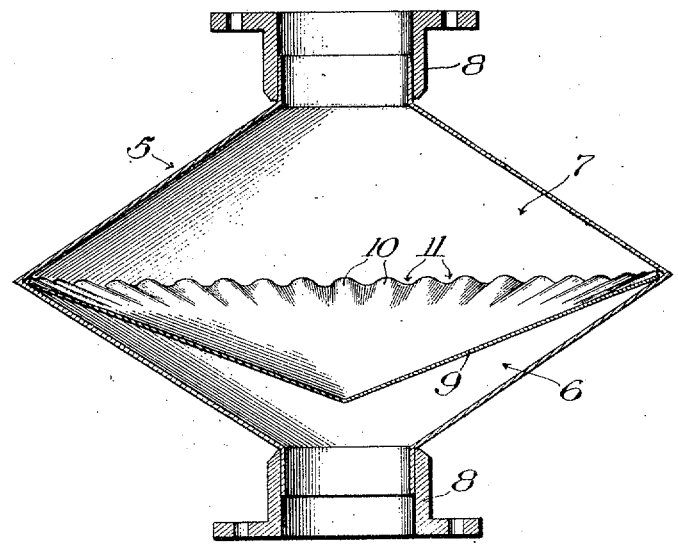
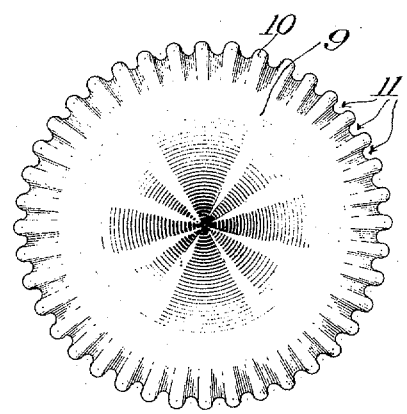
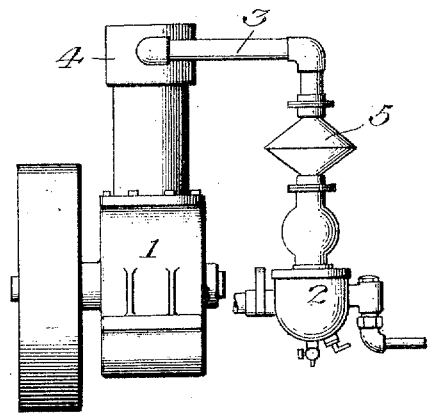

GEORGE HANIQUET, OF LONGBEACH, CALIFORNIA, ASSIGNOR, BY DIRECT AND MESNE ASSIGNMENTS, OF TWO-THIRDS TO A. CRAIG, OF LOS ANGELES, CALIFORNIA.

GAS AND AIR MIXER.

986,280.  Specification of Letters Patent.  Patented Mar. 7, 1911.

Application filed March 2, 1910. Serial No. 546,949.

*To all whom it may concern:*

Be it known that I, GEORGE HANIQUET, a citizen of the United States, residing at Longbeach, in the county of Los Angeles and State of California, have invented a new and useful Gas and Air Mixer, of which the following is a specification.

This invention relates to a device for mixing air with gas, for the purpose of producing the proper explosive mixture adapted for use in internal combustion engines.

The device is adapted to be located between the carbureter or spray nozzle and the intake port or ports of the cylinder.

Among the main objects of the invention are to produce a device of the character described which is of exceedingly simple construction, effective in operation, and durable in use with no movable elements or parts to get out of order.

A further object is to produce a perfect mixture and thereby reduce the amount of carbon or other residue deposited on the piston or in the cylinder. Increasing the power of the motor makes the motor smoother running and corrects one of the main causes of overheating. The motor can be run on less fuel on account of obtaining a more perfect proportion of fuel and air.

Referring to the drawings: Figure 1 is a vertical longitudinal section through the device. Fig. 2 is a plan view in detail of the spreader. Fig. 3 is a front elevation of an explosive engine showing the invention located in the induction pipe between the carbureter and cylinder.

Referring to Fig. 3, 1 designates the internal combustion engine; 2 designates the carbureter, and 3 the induction pipe leading to the cylinder 4 of the engine. 5 designates the gas and air mixer which is connected to the induction pipe 3 and carbureter 2. The gas and air mixer 5 comprises two conical chambers 6 and 7. Flanged fittings 8 are connected to the respective ends of the chambers 6 and 7 and afford means of connection to the carbureter 2 and induction pipe 3.

Separating the chambers 6 and 7 is a conical spreader 9 arranged with its rim fitting in the circumferential groove formed at the junction between the chambers 6 and 7 and the spreader 9 is arranged with its apex at the bottom as shown. The spreader 9 is formed with radial corrugations 10 which extend from the rim only a short distance toward the apex, thus producing a corrugated rim forming a large number of recesses 11 which act as passages giving communication from chamber 6 to chamber 7. The aggregate area of the passages 11 is equal to or slightly greater than the cross sectional area of the fitting 8.

It will be noted that the included angle of the walls of the spreader 9 is greater than the included angle of the walls of the chamber 6, so that the annular space formed within the chamber 6 below the spreader 9 is largest at the bottom and is gradually diminished in volume as it approaches the upper and outer portions thereof.

In operation, the carbureted fluid is drawn by suction from the carbureter 2 into the chamber 6 and as it enters the chamber 6 it strikes the spreader 9 and is drawn by suction upward and outward toward the air passages 11. This action within the chamber 6 results in attenuating the charge and it passes over the corrugated edge of the spreader 9 through the passages 11 as a thin film which splits up the particles of the mixture and diffuses and intermingles the air and gas. As the air and gas passes through the passages 11 and enters the upper chamber 7 it expands, there being a partial vacuum in the upper chamber during the suction stroke which causes the gas and air to thoroughly mix or unite in the upper chamber 7 from whence it passes through the upper fitting 8, through the induction pipe 3 and thence to the cylinder 4 of the engine.

It should be understood that the chambers may be conical, spherical, or other design.

The device is capable of operation successfully with gasolene, kerosene, or other combustible fluids.

It should be understood that by the term "gas" I refer to the liquid combustible in the form of vapor or gas as introduced into the cylinders of internal combustion engines.

What I claim is:

1. A gas and air mixer comprising a lower conical chamber, an upper conical chamber, a conical spreader separating the two chambers, said spreader having passages between the two chambers.

2. A gas and air mixer comprising a lower conical chamber, an upper conical chamber, a conical spreader separating the two chambers, said spreader having passages between the two chambers, said spreader having radial corrugations extending a portion of the distance from the rim toward the apex.

3. A gas and air mixer comprising a lower conical chamber, an upper conical chamber united therewith, said chambers being formed with two dished disks, a conical spreader with its apex at the bottom separating said chambers, said spreader consisting of a dished disk having a greater angle than the walls of the lower chamber, thereby producing an annular space in the lower chamber which is gradually tapered toward its upper portion.

4. A gas and air mixer comprising a lower conical chamber, an upper conical chamber united therewith, said chambers being formed of two dished disks, a conical spreader with its apex at the bottom separating said chambers, said spreader consisting of a dished disk having a greater angle than the walls of the lower chamber, thereby producing an annular space in the lower chamber which is gradually tapered toward its upper portion, said spreader having corrugations which extend a portion of the distance from the rim to the apex, and its rim being formed with corrugations forming passages.

5. A gas and air mixer comprising a lower conical chamber, an upper conical chamber united therewith, said chambers being formed of two dished disks, a conical spreader with its apex at the bottom separating said chamber, said spreader consisting of a dished disk having a greater angle than the walls of the lower chamber, thereby producing an annular space in the lower chamber which is gradually tapered toward its upper portion, said spreader having corrugations which extend part way from its rim to the apex, and its rim being formed with corrugations forming passages, the first named corrugations being tapering.

In testimony whereof, I have hereunto set my hand at Los Angeles, California, this 23d day of February 1910.

GEORGE HANIQUET.

In presence of—
G. T. HACKLEY,
FRANK L. A. GRAHAM.